United States Patent
French et al.

[11] 3,771,233
[45] Nov. 13, 1973

[54] ELECTROSTATIC ENHANCEMENT OF EVAPORATION

[75] Inventors: Park French, Aurora; Thomas Squire Piwonka, North Canton, both of Ohio

[73] Assignee: TRW Inc., Cleveland, Ohio

[22] Filed: Jan. 14, 1972

[21] Appl. No.: 217,759

[52] U.S. Cl. .................................................. 34/1
[51] Int. Cl. ............................................. F26b 3/34
[58] Field of Search ................. 34/1; 315/1, 36 X

[56] References Cited
UNITED STATES PATENTS

| | | | |
|---|---|---|---|
| 3,703,665 | 11/1972 | Yereance et al. | 315/36 |
| 3,358,378 | 12/1967 | Downs | 34/1 |
| 3,398,322 | 8/1968 | Guenther | 315/36 X |
| 3,448,323 | 6/1969 | Owens | 315/1 |
| 3,456,359 | 7/1969 | Smolski | 34/105 |
| 3,491,456 | 1/1970 | Candor et al. | 34/1 |

Primary Examiner—Carroll B. Dority, Jr.
Assistant Examiner—Larry I. Schwartz
Attorney—Carlton Hill et al.

[57] ABSTRACT

By applying high voltage D.C. discharge to a liquid or solid mass containing liquid, the surface of which is in contact with a circulating gaseous atmosphere such as air, evaporation of the liquid is promoted, due to turbulence of the atmosphere brought about by the discharge adjacent the surface of the body from which the liquid is evaporated. This phenomenon is particularly useful in removing moisture from irregular shaped bodies such as investment casting shell molds which require uniform drying in order to improve strength and mitigate cracking. Drying rate is increased without the attendant disadvantages experienced when attempts are made to increase drying rates using conventional drying techniques such as oven and tunnel drying.

7 Claims, 6 Drawing Figures

ELECTROSTATIC ENHANCEMENT OF EVAPORATION

BRIEF SUMMARY OF INVENTION

This invention involves the use of a high voltage electrostatic charge provided by a direct current source to promote the evaporation of moisture or other liquid from a body which may be liquid or solid containing the liquid and is particularly useful in connection with the removal of moisture from irregularly shaped bodies such as ceramic investment casting molds. In preparing shell molds for investment casting it is common practice to apply a number of coatings of the ceramic material to the wax or plastic pattern and dry each coating before applying the next coating. A sufficient number of coatings are applied to give the mold desired strength. After the mold is built up to the required thickness it is finally dried to lower the moisture to an irreducible minimum content. If non-uniform drying occurs, cracking of the mold may result because of the internal stress between the dry and the still drying portions of the mold. Cracking of the mold may also occur if evaporation causes too much chilling of the mold during drying since upon warming up, the expansion of the wax pattern may produce enough stress to cause mold cracking. As the number of coats applied to the mold increases, drying becomes increasingly more difficult. Where the shape of the mold is irregular or there are creases and recesses, drying is likely to be non-uniform, resulting in the development of internal stress between the dry and still drying portions of the mold with consequent cracking.

The present invention overcomes the problem of non-uniform drying by reason of the fact that the electrostatic field causes hydrodynamic instability in the gas at the evaporating surface. These instabilities result in a substantial stirring or turbulent action near the surface of the mold which acts to mix the gas in contact with the surface with the gas at some distance away from the surface. This action reduces the concentration of evaporated material at the surface enhancing the evaporation rate. The action also transports the evaporated material some distance away from the surface of the mold and mixes it with the surrounding gas, permitting easy removal thereof from the general location by low velocity blowing or pumping of surrounding gas.

The surface electric field is due in large measure to the volume charge in the neighboring gas and therefore extends well into cavities and around corners. Consequently, this method of evaporation promotes uniformity of evaporation from irregular surfaces. Not only does the invention provide more uniform drying but it permits much more rapid drying without adversely affecting the strength of the mold or causing cracking.

While the invention is particularly useful in connection with drying molds, it is useful in connection with any type of evaporation since it increases the rate of evaporation and thereby enables the use of smaller evaporating surfaces when used in conjunction with conventional evaporating techniques to obtain the same rate of evaporation.

It is an object of the invention to provide a novel method for evaporating liquids from liquid bodies or from solid bodies in which an evaporable liquid is present.

Another object of the invention is to provide a method for uniformly removing moisture from irregularly shaped bodies.

A still further object of the invention is to provide a method for drying investment casting ceramic molds.

Still another object of the invention is to provide a method for drying ceramic investment casting molds in a manner to reduce the amount of cracking and increase the strength thereof.

Another object of the invention is to provide means for increasing the rate of evaporation of liquid from an evaporable mass without increasing the temperature thereof.

Another object of the invention is to provide apparatus for applying an electrostatic charge to a body undergoing evaporation in order to enhance evaporation.

Further objects will become apparent from the following description.

Figure 1:
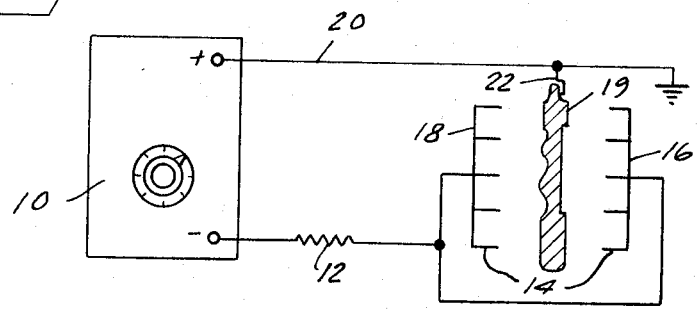
FIG. 1 is a schematic showing of apparatus for electrostatically drying a ceramic investment casting mold.

Referring to the drawings, particularly FIG. 1, the numeral 10 indicates a source of high voltage D.C. current as, for example, a Phillips X-ray machine power supply capable of providing from 0 to 40,000 volts. A variable voltage supply provides some degree of control over the process. The voltage may be somewhat greater or less than 40,000 as for example 20,000 to 60,000 volts. The negative pole of the voltage source is connected to a resistor 12. The resistor is placed in the circuit in order to protect the high voltage supply against current surges in the event of sparking. The resistor 12 may be made up of 60 2-watt carbon resistors at 220K ohms each, soldered together in series to make up the series resistance. By placing the resistance in a length of double walled insulating plastic tubing, the resistor chain can be used as the connecting cable between the voltage source and the electrodes to be described.

The numeral 14 represents an array of needle electrodes. The needles may be supported in insulating plastic blocks and disposed in spaced relation so as to generally cover the area of the object to be dried or evaporated. The number of needles will depend on the size or surface to be dried but it is important that the needles be spaced at a distance not less than about 2 inches apart in order to prevent discharge across the needles. Although the diameter of the needles is not critical we prefer to use needles which are tapered from a diameter of about 0.02 inch at the end inserted in the plastic block to a tip having a diameter of about .01 inch. As shown in the drawing, two blocks 16 and 18 are provided for mounting an array of needles on either side of mold 19. It will be understood, however, that the number of arrays will depend on the size and shape of the mold or other surface undergoing drying or evaporation. The tips of the needles could ordinarily be about 2 to 6 inches and preferably not less than 3 inches from the surface undergoing evaporation, depending on the voltage, but should be a distance sufficient to avoid sparking.

The positive pole of the voltage source is connected by line 20 to the mold 19. The mold 19 may be supported between the array of needle electrodes by means of hook 22. Although best results have been observed in the above example using the polarity shown in FIG. 1, good results can also be obtained using the opposite polarity. In some applications, the opposite polarity may be preferable.

Figure 2:
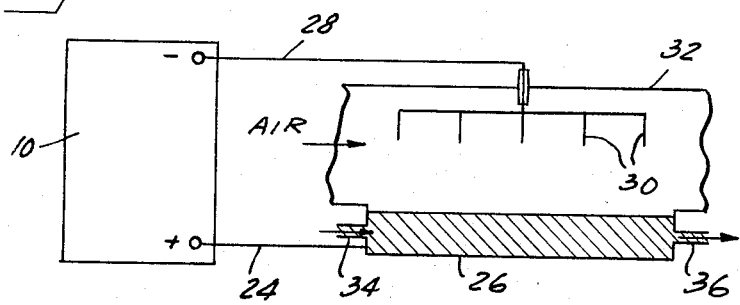
FIG. 2 is a schematic showing of apparatus for electrostatically enhancing evaporation from a body of liquid undergoing evaporative cooling.
Figure 3:
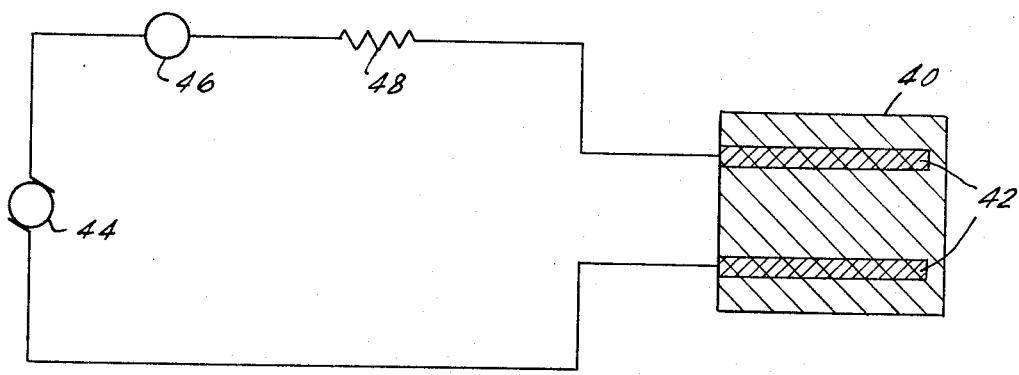
FIG. 3 is a schematic diagram of a circuit for measuring moisture content in a ceramic mold which is undergoing drying.

Referring now to FIG. 2, the invention is illustrated as applied to evaporative cooling of a stream of water. The numeral 10 represents the high voltage D.C. source current which may be the same as or different from that used in FIG. 1. The positive pole is connected by line 24 to the open top conducting vessel 26 through which the water passes. The negative pole of the voltage source is connected by line 28 to an array of spaced needle electrodes 30. The needle array 30 is located within duct 32 through which a current of air is caused to pass actuated by a fan or suction device. The open top of vessel 26 is located within the duct. An inlet 34 and an outlet 36 is provided for passing warm water into and withdrawing cool water from the vessel 26, respectively. The action of the high voltage direct current electrostatic field in drying or evaporating is believed to be as follows. The discharge causes hydrodynamic instabilities in the gaseous atmosphere at the evaporating surface. These instabilities result in a substantial stirring or turbulent action near the evaporating surface which acts to mix the gas in contact with the surface with the gas at some distance away from the surface. This action reduces the concentration of evaporated material at the surface which results in an enhancement in the evaporation rate. The evaporated material is transported some distance away from the surface and mixes with the gas environment permitting easy removal from the general location of the evaporating surface by the air stream passing through the duct.

In order for the electrostatic method of evaporation to be effective, the conductivity of the solid or liquid which is undergoing drying or evaporation must be sufficient to carry the discharge current (typically 10 to 50 microamperes per electrode in air at atmospheric pressure) without developing resistive voltages which are sizeable fractions of the applied high voltage. Otherwise, the discharge will be suppressed. Where liquids or bodies of very low conductivity are to be evaporated or dried, internal conductors may be placed in the body in order to shorten the current paths through the material.

Figure 4:
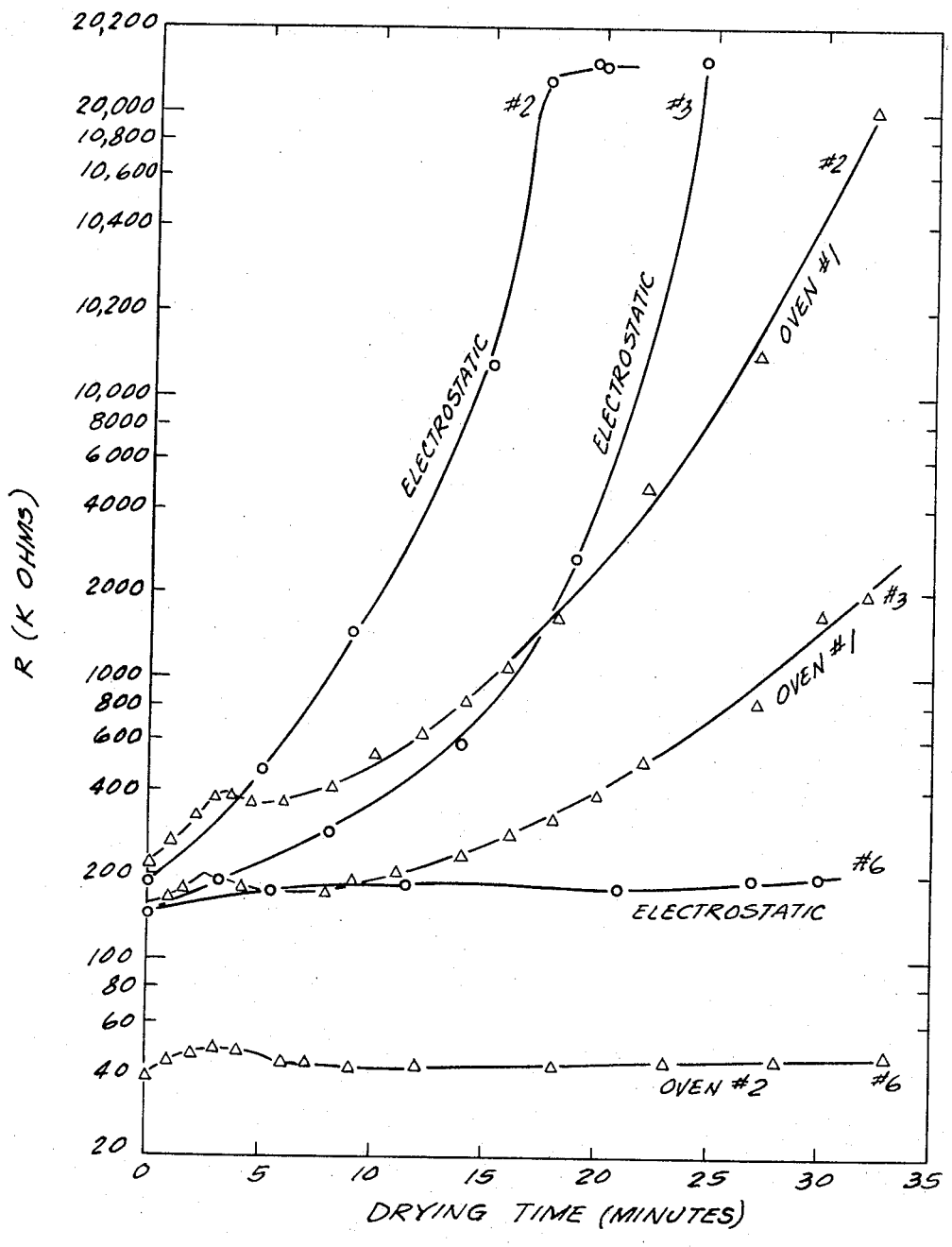
FIG. 4 is a graph showing a comparison between rates of drying using the electrostatic method of the invention to supplement conventional oven drying and conventional oven drying alone to dry ceramic investment casting molds.

The surface electric field is due in large measure to the volume charge in the surrounding gas and, therefore, extends uniformly well into cavities and around corners. Consequently, this method of evaporation is useful in promoting uniformity of evaporation from irregular surfaces. It is advantageous to provide some method of moving the air or other gaseous atmosphere from the vicinity of the evaporating surface in order to carry away the evaporated liquid and avoid high concentrations of the evaporated liquid within the vicinity of the body undergoing evaporation. A given air velocity maintains a corresponding equilibrium boundary layer thickness at the drying surface. Increasing the velocity decreases the layer thickness and increases the drying rate but eventually reaches a point of diminishing return. A suitable air velocity is 125 feet per minute at the drying surface. Obviously, higher or lower air velocities may be used.

As previously pointed out, the electrostatic field enhances the mass transport at the surface of the mold or other object undergoing dehydration or drying. Lower humidity of the atmosphere adjacent the surface forces moisture out to the mold surface by capillary action. Here the moisture mixes with the surrounding air decreasing the saturation at the mold surface. Air adjacent to the surface discharges by ion migration to the surface, creating a layer of air having a low charge density between the surface and air having higher charge density. The high charge density air is electrostatically attracted to the surface, expelling the low charge density air in numerous areas and resulting in substantial turbulence. Dry air from the surroundings now mixes turbulently with the wet air at the surface of the mold. The rate of evaporation is thus increased and the mold dries faster.

The amount of moisture left in a mold or other object undergoing dehydration may be monitored in two ways. First, by direct weight measurement and second, by making resistance or conductivity measurements at different periods during the drying or dehumidification process. To determine the rate of drying of ceramic molds the resistance or conductivity measurement method was used. Dry ceramic is generally a very poor conductor of electricity. The conductivity of $SiO_2$ for example is less than $10^{-14}$ MHOS/CM. A ceramic mold has, however, as much as 30 percent porosity. When wet it may hold as much as 20 percent of its weight in solution containing both binding and stabilizing salts. A wet mold is, therefore, a relatively good conductor. The conductivity depends on the amount and constitution of the solution present. For a given composition the conductivity decreases as the mold dries and the moisture content decreases. The degree of dryness can consequently be monitored by observing the corresponding conductivity reading. Although the resistance is non-linearly related to the amount of moisture present and hence to the weight loss, it is quite easy to tell when the mold is dry for at this point the resistance increases rapidly with time to a constant value.

Tests were carried out on ceramic shell molds built up in layers on a plate wax pattern. Nichrome strips one-eighth inch wide and 0.01 inch thick were embedded in the wax pattern and separated by one-half inch spacing. By measuring the conductivity across the strips at different locations the rate of drying could be observed at different points on the surface of the mold using the circuit shown in FIG. 3. The mold 40 containing the wax pattern with embedded nichrome strips 42 is connected to a source 44 of 100 A.C. volts in series with a 0–10 A.C. millimeter 46 and 10K carbon resistor 48.

FIG. 4 is a graph of resistance measurements plotted for measurements of the drying rate after application of each of coats 2, 3 and 6 on a ceramic plate mold. Measurements were taken during drying of the coatings after the second, third and sixth dips. It is evident from the graph that the resistance increased more rapidly in each case where oven drying was supplemented with electrostatic drying than when oven drying alone was used. In each case, the electrostatically dried mold dried almost twice as fast as the oven dried mold. For example, after the second dip the mold dried within 18 minutes in the electrostatic field, whereas the oven drying time was 33 minutes. After the third dip, the mold dried electrostatically within 25 minutes, whereas when dried in the oven the drying time extrapolated was 72 minutes. The drying ovens used were a series of Webb Tunnels in which temperature gradually increased from about 88° F. in the first to about 105° in the last and air flow velocity and humidity were controlled.

Figure 5:
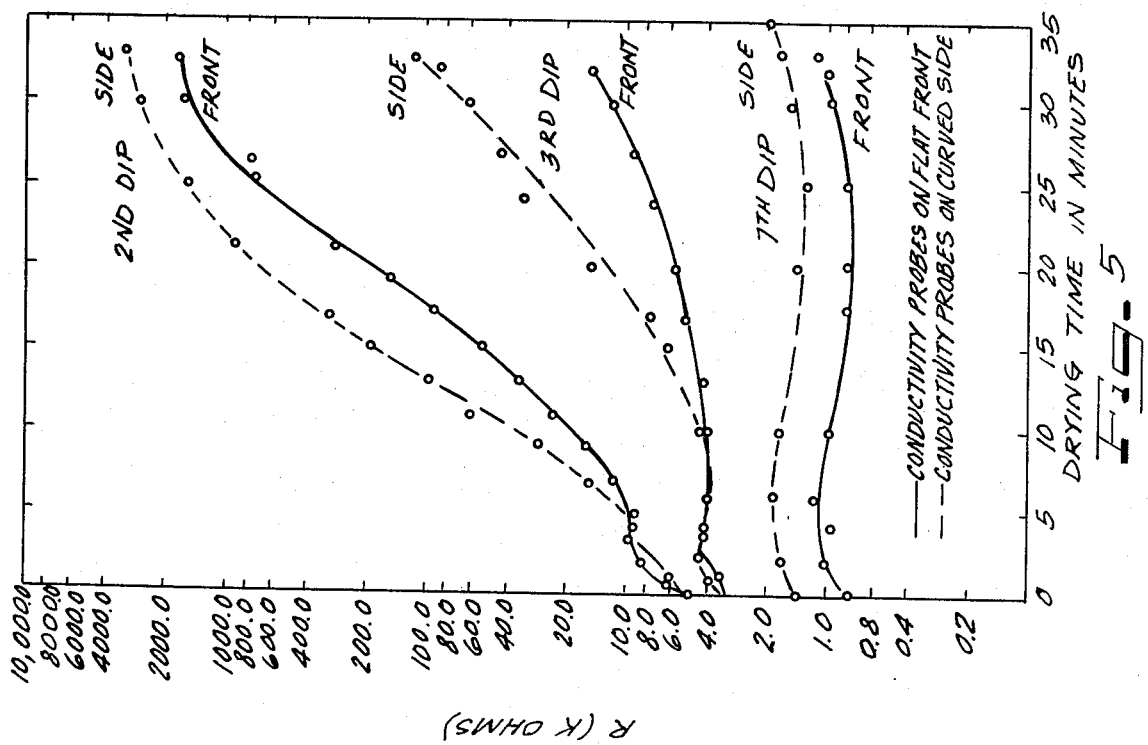
FIG. 5 is a graph showing the different rates of drying at different parts of a ceramic plate mold when using conventional oven drying.

FIG. 5 is a plot of measurements taken comparing drying rates at different locations on a plate mold for the second, third and seventh dips using the drying ovens without the electrostatic field. It will be noted that in each case the front of the mold dried more slowly than the side. This was due to the air flow pattern in the oven. The areas directly exposed to the moving air dry more rapidly than those areas which are not directly exposed to the moving air flow.

Figure 6:
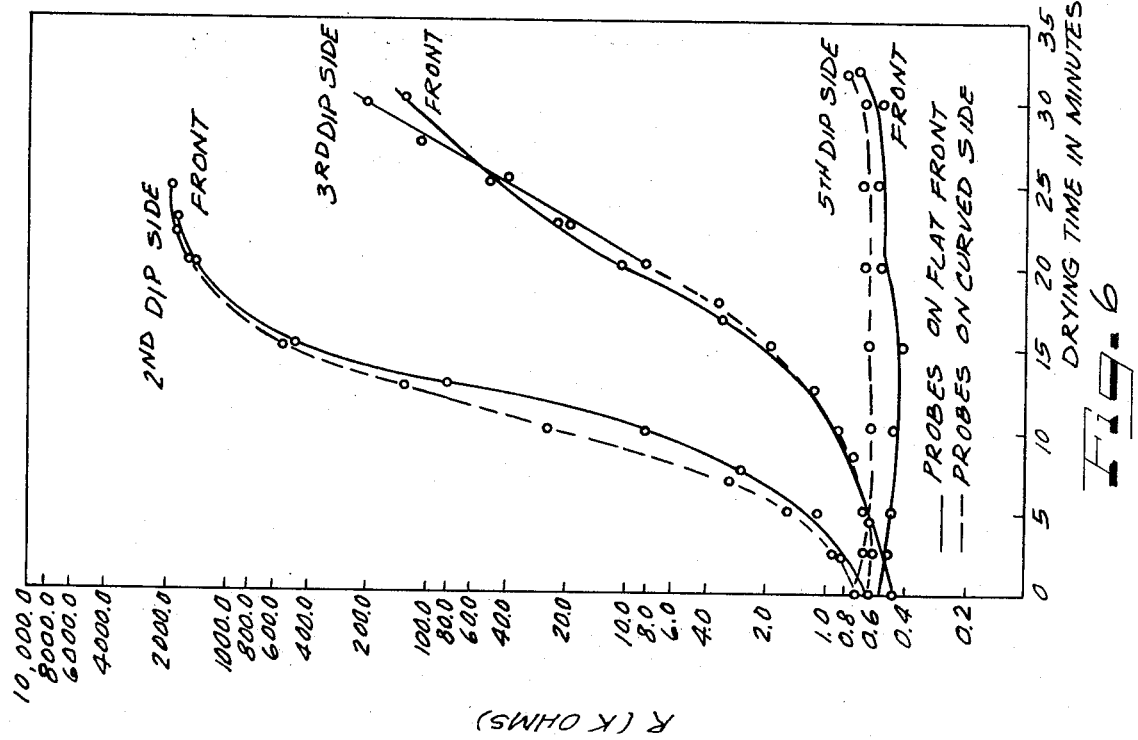
FIG. 6 is a graph showing a comparison between the rates of drying at different parts of a ceramic plate mold when using the electrostatic drying method of this invention to supplement oven drying.

FIG. 6 is a graph showing the same measurements during drying of a ceramic plate mold duplicating the mold tested in FIG. 5, after the second, third and fifth dips in which the electrostatic drying method was used to supplement oven drying. In each case, the rate of drying of the side and front of the mold was substantially the same demonstrating that the drying rate was uniform around the mold.

A comparison of FIGS. 5 and 6 shows that the application of the electrostatic method not only increases the rate of drying but also dries the mold uniformly, thereby avoiding undue stresses and cracking in the mold.

It was previously pointed out that the resistance in a mold undergoing dehumidification or drying is non-linearly related to the amount of moisture present and hence to the rate of weight loss. While weight loss measurements give an indication of the rate of drying, they are considered to be less accurate than conductivity measurements because of the fact that during the handling and drying process the mold loses sand as well as water, and the sand loss affects the accuracy of the results. A further advantage of the resistance or conductivity measurement is that it permits measurement without interrupting the drying process or the necessity of removing the mold from the drying environment. Thus the progress of the drying can be monitored at short intervals and unnecessary time delay during the drying cycle is eliminated.

While electrostatic drying and dehumidification can be practiced separately from conventional oven or tunnel drying or dehumidification, electrostatic drying is most advantageously used to supplement conventional drying methods in which case it will significantly shorten the drying time. For example, on tests made on a single blade ceramic mold dried in a conventional oven, a 50 percent reduction in dry time was observed when the drying was conducted in the presence of the electrostatic field.

While rate of drying using conventional drying means such as ovens and tunnels can be increased by increasing temperature, lowering humidity and increasing air velocity, attempts to increase rate of drying of ceramic molds by these methods result in internal stresses weakening the strength of the mold and producing cracking because of non-uniform drying.

It will be seen, therefor, that a novel means has been devised for promoting evaporation of moisture and other liquids from solid or liquid bodies by applying a high voltage D.C. electrostatic charge to the body and gaseous atmosphere in contact therewith. Not only is the evaporative process speeded up but it proceeds uniformly around the surface, whether it be regular or irregular in contour. The invention is particularly useful in the dehumidification of ceramic molds where uniformity of drying and dehumidification is necessary to prevent production of defective molds.

We claim as our invention:

1. The method of removing moisture from investment casting ceramic shell molds comprising removing moisture from the mold by subjecting it to air drying at a temperature sufficiently low to avoid cracking and simultaneously applying to the mold a high voltage D.C. electrostatic charge uniformly distributed over the surface of the mold by placing a plurality of needle-like electrodes in uniformly spaced relation about the entire surface of the mold, said electrodes being connected to one pole of a high voltage D.C. current source and the mold being connected to the other pole of said source, said electrodes being spaced from each other a distance sufficient to avoid discharge therebetween and at a sufficient distance from the mold surface to avoid sparking, thereby to dry the mold uniformly and increase the rate of drying of the mold without causing cracking thereof.

2. The method in accordance with claim 1 in which the current in the circuit is sufficiently small so as not to produce any substantial heating of the mass.

3. The method in accordance with claim 2 in which the voltage is between approximately 20 and 60 KV.

4. The method in accordance with claim 3 in which the current is about 2 milliamps.

5. The method in accordance with claim 2 in which the needle-like electrodes are spaced about the mold with the tips of the needles spaced not less than about 3 inches from the mold.

6. The method in accordance with claim 1 in which the mold is simultaneously heated to a temperature between about 80° and 108° F.

7. The method in accordance with claim 2 in which the voltage is of sufficient magnitude to cause turbulence of the gaseous atmosphere in contact with the surface of the mold.

* * * * *